May 25, 1943.  R. R. ROBERTSON  2,319,949
ROAD JOINT ROPE SEAL
Filed Feb. 19, 1942   2 Sheets-Sheet 1
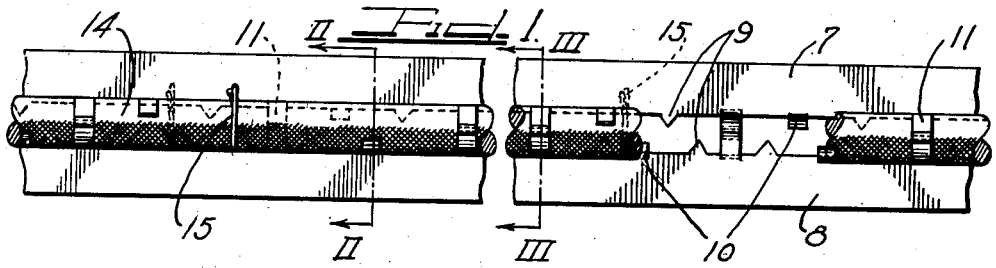
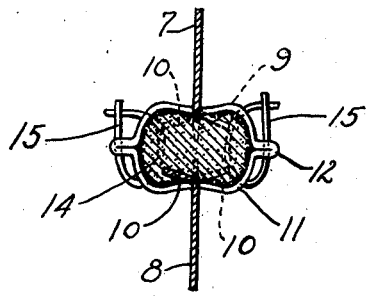
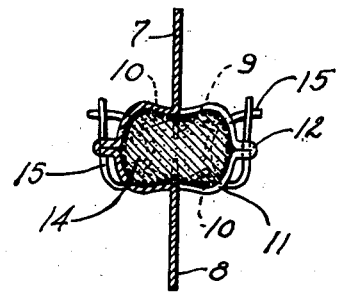
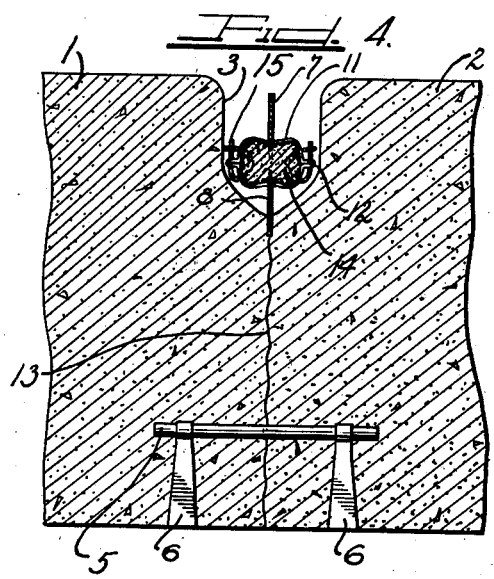
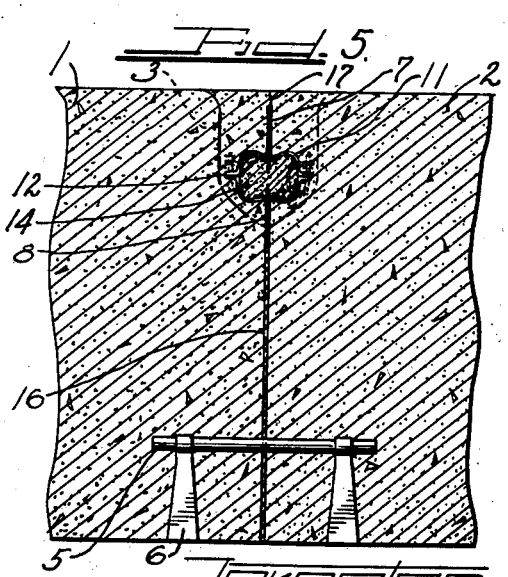
Inventor
ROBERT R. ROBERTSON May 25, 1943.                R. R. ROBERTSON                2,319,949
                             ROAD JOINT ROPE SEAL
                             Filed Feb. 19, 1942           2 Sheets-Sheet 2
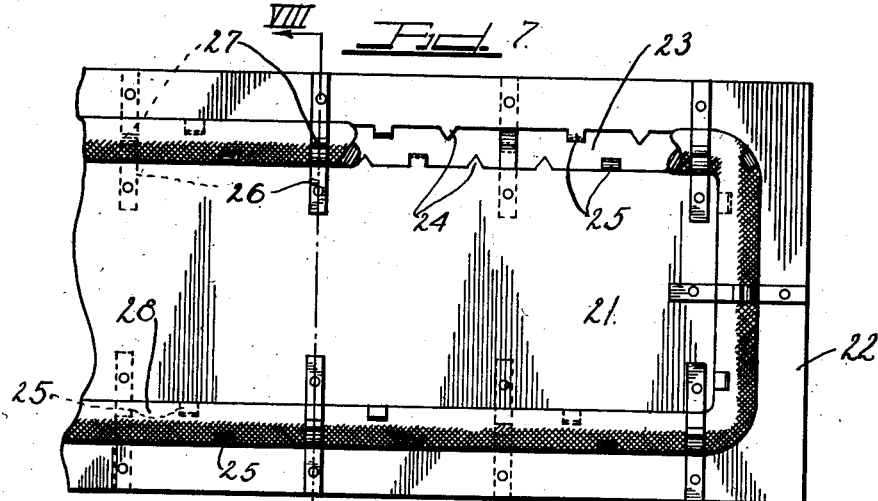
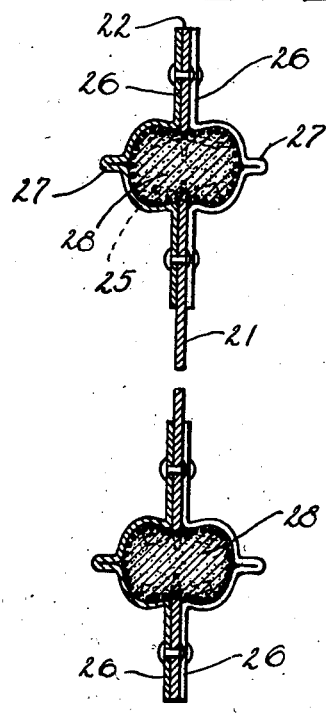
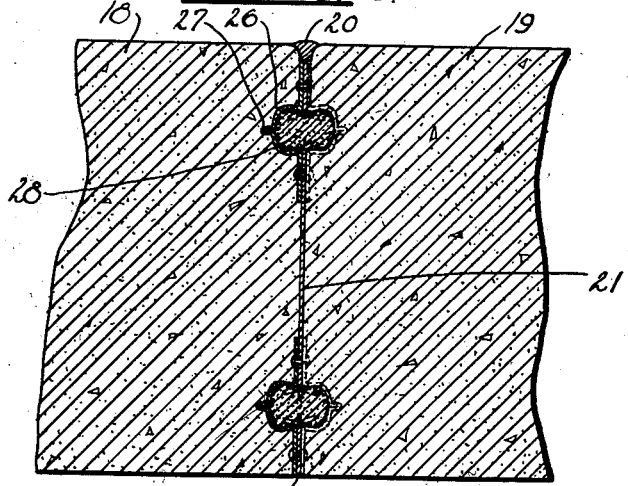
Inventor
ROBERT R. ROBERTSON Patented May 25, 1943

2,319,949

UNITED STATES PATENT OFFICE 2,319,949

ROAD JOINT ROPE SEAL

Robert R. Robertson, Chicago, Ill.

Application February 19, 1942, Serial No. 431,476

11 Claims. (Cl. 94—18)

This invention relates to joints, and more particularly to concrete road construction joints, of the contraction type, or for a road joint seal including a rope like seal member engaged between adjacently positioned edges of joint or seal plates to provide an efficient seal between adjacent road slabs to prevent the leakage of water and foreign materials downwardly through the joint crack and thereby eliminate undermining of the road slabs.

It is an object of this invention to provide a rope like seal member between plates forming a seal joint or a road joint between adjacent concrete slabs.

It is also an object of this invention to provide a road joint seal including a rope like means adapted to be held in compressed relationship between adjacent edges of joint members or plates adapted to engage opposite longitudinal portions of the rope seal to cause the same to bulge in opposite directions at substantially right angles to the plate members and be embedded in concrete road slabs to provide a suitable seal against the leakage of water and foreign materials down through the joint.

It is also an object of this invention to provide an improved type of road joint seal comprising upper and lower plates disposed at substantially the same plane and having gripping or retaining means formed thereon or connecting the same for the purpose of gripping and squeezing a rope like seal member between the plates to serve as a seal member connecting the road slabs on opposite sides of the joint plates and obviating the leakage of water and foreign materials into the joint beneath the seal.

Another object of the invention is the provision of a contraction joint road seal wherein a pair of plate members are separated by a continuous opening having engaged therein a continuous rope like sealing member which is gripped and held in a compressed condition to project from opposite sides of the joint plate to produce a continuous seal around the inner plate which is framed by the seal member and the outer plate of the joint construction.

It is furthermore an object of this invention to provide a road joint wtih a continuous seal positioned around an inner plate and within an outer frame-like plate.

It is an important object of this invention to provide a road joint or a road joint seal with a seal member constructed of rope or braid of either round or rectangular cross section and held in squeezed position by gripping or retaining means between plate like members forming part of the joint or seal.

Other and further important objects of this invention will be apparent from the disclosures of the specification and the accompanying drawings.

The invention (in preferred form) is illustrated in the drawings and hereinafter more fully described.

In the drawings:

Figure 1 illustrates a fragmentary side elevational view of a road joint seal, embodying the principles of this invention, and in assembled form ready to be placed in position in a receiving groove formed between road slabs ready to be embedded by a supplemental pouring of concrete to fill the groove and embed the seal.

Figure 2 is an enlarged transverse detail sectional view taken on line II—II of Figure 1 through one of the retaining lugs and showing the staggered anchoring pins engaged in opposite sides of the rope seal.

Figure 3 is an enlarged vertical transverse sectional view taken on line III—III of Figure 1 through one of the connecting straps.

Figure 4 is a fragmentary vertical detailed section taken through a portion of a concrete road, having dowell bars embedded in the lower portion of the concrete slab and passing through the plane of the contraction joint, said view also illustrating a rope seal unit engaged in a groove at the upper portion of the road section with the lower plate partially projecting downwardly into the concrete to produce a contraction joint crack after the seal retaining groove is filled with concrete and the entire body of concrete has set.

Figure 5 is a fragmentary vertical detailed sectional view taken through a portion of a concrete road between opposite slabs of the road, with a modified form of the device embedded in the form of a contraction joint wherein the lower plate of the rope seal unit extends downwardly to the sub-grade.

Figure 6 is a side elevational view of a modified form of the rope seal unit in the form of a contraction joint wherein a continuous rope or braid seal is gripped and compressed around an inner plate and within an outer frame like plate.

Figure 7 is an enlarged fragmentary side elevation of the modified form of contraction joint shown in Figure 6 with parts broken away to show the gripping teeth and retaining lugs formed on the plate for holding the rope seal in position.

Figure 8 is an enlarged fragmentary detailed transverse section taken on line VIII—VIII of Figure 7.

Figure 9 is a fragmentary vertical detailed section taken through the modified form of the contraction joint as shown in Figure 6 when embedded between concrete road slabs.

As shown in the drawings:

The improved joint or seal of this invention is primarily for use in concrete constructions such as concrete roads and the like, and it is adapted for use as a contraction joint forming unit or as a contraction seal unit including compressible rope like seal members for obviating leakage into the joint below the seal structure.

The reference numerals 1 and 2 designate adjacent concrete road slabs, which after being poured, and when only partially set, have a transverse groove 3 cut out of or formed in the top portion thereof as clearly illustrated in Figure 4, in the plane of a joint which is to be formed between the road slabs.

When it is desired to prevent the vertical movement of the road slabs vertically with respect to one another, a plurality of spaced dowel bars 5 are supported in parallel relation above the road sub-grade by means of brackets or supports 6, which are embedded in oppositely positioned pairs in the road slabs 1 and 2, as shown in Figure 4, in position to hold the dowel bars to extend through the plane of the joint.

In order to provide a seal between the road slabs to obviate the leakage of water and foreign materials downwardly in the plane of the joint between the road slabs, an improved contraction road joint seal is engaged in the road groove 3 in the vertical plane of the joint which is to be formed. After the seal unit is engaged in position as shown in Figure 4, a supplemental supply of concrete is deposited in the groove 3 to completely embed the road joint seal unit, similar to the arrangement shown in Figure 5.

The improved road joint seal unit, as illustrated in Figures 1 to 4, inclusive, comprises an upper plate 7 and a lower plate 8, positioned in the same plane. The adjacent or opposite edges of the upper and lower plates 7 and 8, respectively, are spaced apart and have integrally formed thereon a plurality of spaced gripping teeth 9. Also integrally formed on the oppositely positioned edges of the plates 7 and 8 are a plurality of gripping lugs or fingers 10. Integrally connecting the upper and lower plates are a plurality of staggered connecting straps 11, the middle portions of which are clamped or pinched together to provide a projecting seal finger or anchoring loop 12 which acts as a spring connection between the upper and lower portions of each of the respective clamping or retaining straps 11. Each finger 12 furthermore acts as a seal for obviating the leakage of liquids from around the upper portion of a connecting strap or loop downwardly past the lower portion of the seal unit and into the contraction joint crack 13 which is formed by the lower plate 8 projecting into the concrete and causing the concrete to consequently crack in a plane of the contraction joint with the dowel bars 5 projecting through the contraction joint crack which separates the road slabs 1 and 2 as illustrated in Figure 4.

After the road joint seal plates 7 and 8 are formed as illustrated in Figure 1 and are connected by means of the straps 11, a seal member is engaged between the upper and lower plate. The seal member is designated by the reference numeral 14, and may be in the form of a twisted or braided rope, or in the form of a stranded braid or tape of either round or rectangular cross section. The seal rope 14 may be treated or impregnated to make the same waterproof, and as shown in Figure 1, is engaged longitudinally in the space between the plates 7 and 8 after which the plates are moved inwardly toward one another to cause the teeth 9 to bite into the rope seal. The retaining lugs 10 are bent to extend downwardly into gripping engagement with the rope to assist in holding the same in place. The connecting straps 11 are compressed as illustrated in Figure 2, and the middle portions of said straps are pinched together to form the projecting fingers or lugs 12. By moving the plates 7 and 8 toward one another, the rope seal is compressed and securely held in place bulging or protruding outwardly from opposite surfaces of the seal plates 7 and 8.

For the purpose of anchoring the rope seal 14 to the oppositely positioned road slabs 1 and 2, a plurality of anchoring pins or clips 15 are engaged through side portions of the rope seal in staggered relationship with respect to one another. When the seal unit is embedded in concrete with the filling of the groove 3, the sides of the rope seal are anchored in the road slabs so that with the contraction of said slabs there is a tendency to pull in opposite directions on the compressible rope seal to transversely widen the rope seal to fill any gaps which might occur with the contraction of the road slabs and thereby maintain the seal at the upper portion of the road joint.

The road joint seal plates 7 and 8 may be of the same width as shown in Figure 1, or, if desired, the lower plate may be wider than the upper plate to permit the lower marginal edge thereof to be projected downwardly into the concrete of the road when the seal unit is placed within the groove 3, as illustrated in Figure 4, leaving the upper edge of the top plate 7 disposed a short distance below the top surface of the road. When the groove is filled up with a supplemental supply of concrete to embed the road seal and the concrete forming the slabs 1 and 2 and the filler for the groove 3 sets, the lower seal plate 8 acts to cause the concrete to split vertically along the crack line 13, to separate the road slabs beneath the seal. The top seal plate 7 serves as a guide and a means for causing the concrete above the joint to crack from the top edge of the top plate 7 to the top surface of the road. The upper joint crack, if found necessary, may be filled with asphalt or tar.

Figure 5 shows a modified form of contraction road joint and seal with the seal unit at the upper part of the joint and the dowel bar construction at the lower portion of the joint being substantially the same as illustrated and described in connection with Figures 1 to 4, inclusive, of the drawings. In the modified form of the device, the only difference from the joint already described, is that a contraction joint plate 16 is used beneath the joint seal unit. The contraction joint plate 16, together with the dowel bars 5 and the dowel bar support 6 are mounted on the road sub-grade before the pouring of the concrete which forms the slabs 1 and 2, and said dowel bars project through apertures provided at spaced intervals in the plate 16. The concrete is then poured to embed the plate 16 and the dowel bar members, and after the concrete has partially set the groove 3 is cut in the top of the road construction above the plate 16. The road joint seal unit is then engaged in the groove and eventually is embedded in an additional concrete filling which fills the groove 3 and completes the concrete portion of the road. After the concrete has set properly the top plate 7 of the seal unit acts to cause the top crack 17 to form in the plane of the joint upwardly from the top edge of the plate 7 to the top of the road. The crack 17, when necessary, may be filled with asphaltum or tar.

If desired, the contraction joint plate 16 and the seal unit may be combined by replacing the lower seal plate 8 and the joint plate 16 by a single joint plate to extend from the bottom of the seal member downwardly through the concrete to the sub-grade to provide a contraction joint forming mechanism. A rope or braid like seal member which is compressed or clamped in position between the upper plate and the lower plate to provide an efficient seal in the upper portion of the joint mechanism to obviate the leakage of water and foreign materials downwardly to the lower portion of the joint and beneath the road slab to eliminate undermining of the same.

When the lower plate of the seal unit is made sufficiently wide to extend down to the sub-grade, the contraction joint forming mechanism, together with the seal unit portions thereof, is placed in position upon the road sub-grade and may be supported by any suitable means. The concrete is then poured on opposite sides of the joint forming mechanism to embed the upper and lower plates and the rope seal member, thereby making it unnecessary to form the groove 3 and then later on fill the same.

Figures 6 to 9, inclusive, illustrate another modified form, wherein the road joint forming mechanism includes a continuous rope or braid seal, to provide top, bottom and end seals for the joint. The modified form of continuous seal rope joint is adapted to be placed in position upon a road sub-grade at the point where the joint is to be formed. Concrete is then poured on opposite sides of the joint forming mechanism to produce the road slabs 18 and 19 and a top groove which may be filled with asphaltum or tar 20.

The modified form of joint illustrated in Figures 6 to 9, inclusive, comprises an inner or main plate 21 and an outer or frame plate 22. The two plates 21 and 22 are separated by a seal receiving space 23, which continues entirely around the plate 21. The edges of the inner plate 21 have integrally formed thereon gripping teeth 24 and clamping lugs 25. The teeth are disposed in the plane of the plate 21 while the clamping lugs 25 alternately project in opposite directions. The outer or frame plate 22 has integrally formed on the inner peripheral edge thereof spaced gripping teeth 24 and alternately projecting clamping lugs 25. The lugs 25 on the plates 21 and 22 are arranged to project outwardly in opposite directions, with respect to the lugs of an opposite plate, to engage and cradle the seal rope at points between the retaining straps 26, the ends of which are riveted or otherwise rigidly secured to the respective plates 21 and 22 as illustrated in Figure 7. The connecting straps 26 are staggered with respect to one another and are secured to opposite surfaces of the plates 21 and 22. The straps 26 have the middle portions thereof pinched together to project outwardly to provide projecting lugs or fingers 27 which serve as a stop or seal to prevent leakage of water downwardly from the upper portion of the straps 26 into the middle portion of the joint contained within a continuous seal.

Engaged peripherally around the inner joint plate 21 and framed by the outer joint plate 22 is a continuous twisted or braided rope like seal which may be water proofed or treated to obviate leakage of water therethrough. The rope like seal designated by the reference numeral 28 is gripped or clamped between the peripheral edge of the inner plate 21 and within the inner peripheral edge of the outer frame like plate 22 and is held in place by means of the connecting straps 26 which are forced or clamped around the rope like seal to compress the same, as illustrated in Figure 8, to form a seal which obviates the leakage of water and foreign materials past the outer plate 22 inwardly to the inner plate 21. The rope like seal member 28 is also engaged by the lugs 25 and by the teeth 24 of the joint plates to hold the seal member in place between the spaced and staggered connecting members or straps 26. Leakage is prevented around the middle looped portions of the connecting straps 26 by the pinched anchoring projections 27.

When it becomes necessary to anchor the opposite sides of the rope like seal 28 to the road slabs between which the road joint mechanism is embedded, anchoring members such as the anchoring pins 15, illustrated in Figure 2, may be engaged through opposite sides of the rope like seal 28 and are subsequently embedded in the concrete road slabs 18 and 19 to serve as a means for transversely spreading or expanding the rope like seal to fill the space between the road slabs when the slabs contract due to temperature changes or for other reasons.

The plates forming part of the road joint seal or the road joint mechanism may be constructed of sheet metal, in which case the connecting straps 11 may form an integral part of the plates, or separate connecting straps may be riveted or brazed to the plates to span the space between said plates. The plates forming part of the seal or the joint may also be formed of composition board or other suitable tough sheet material, in which case the connecting straps, the clamping lugs and the gripping teeth may be constructed of metal and may be riveted or otherwise secured to the respective plates.

While the improved rope type seal or road joint mechanism as shown in Figures 4 and 5 is associated with dowel bar members, any suitable type of contraction joint supporting base may be used.

In certain constructions, it may be desired to provide a rope seal contraction joint wherein the rope seal extends across the top and down the two sides of the inner plate of the joint mechanism only, in which case the outer seal plate 22 and the rope like seal member 28 may have the lower portions thereof cut off along the base line of the plate 21.

It will, of course, be understood that various details of construction may be varied through a wide range without departing from the principles of this invention, and it is therefore, not the purpose to limit the patent granted hereon otherwise than necessitated by the scope of the appended claims.

I claim as my invention:

1. A road joint seal mechanism for embedding between concrete road slabs and comprising a pair of plates disposed in substantially the same plane opposite and separated from one another, a rope like seal member disposed between said plates, and means on said plates engaging and gripping the seal member to hold the same compressed to bulge the seal member outwardly beyond opposite sides of the plates for anchoring in the concrete slabs.

2. A road joint seal mechanism for embedding between concrete slabs and comprising a pair of plates disposed in the same plane and opposite one another, a rope like seal member separating said plates, and strap like members connecting said plates and compressed to clamp around the seal member to hold the same in place and bulged outwardly from opposite sides of the plates and anchored in the concrete slabs to form a seal therebetween.

3. A joint seal mechanism for embedding between concrete slabs and comprising a pair of plates disposed in the same plane and opposite one another, a rope like seal member separating said plates, strap like members connecting said plates and compressed to clamp around the seal member to hold the same compressed to bulge outwardly from opposite sides of the plates and anchored in the concrete slabs, said strap like members having portions thereof clamped together to form projecting anchoring and seal extensions on the strap like members to obviate leakage around the same and to anchor the straps in the slabs.

4. A joint seal mechanism for embedding between concrete slabs and comprising a pair of plates disposed in the same plane and opposite one another, a rope seal member separating the plates, strap members connecting the plates and clamped around the seal member to compress and bulge the same outwardly for anchoring in the concrete slabs to form a seal therebetween, seal extensions formed on said strap members for embedding in the concrete slabs, and a plurality of members formed on said plates for engaging and gripping the seal member between said strap members.

5. A road joint mechanism for embedding between concrete road slabs and comprising a pair of spaced toothed plates, and a rope seal clamped between said plates and gripped into by said teeth.

6. A road joint mechanism for embedding between concrete road slabs and comprising a pair of spaced connected plates, a rope seal clamped between said plates, and staggered lugs formed on said plates for gripping the rope seal.

7. A road joint mechanism for embedding between concrete road slabs and comprising a pair of spaced connected plates, a water proofed rope seal clamped between said plates, staggered lugs formed on said plates for gripping the rope seal, and gripping teeth formed on said plates and projecting into the rope seal.

8. A road joint mechanism for embedding between concrete road slabs and comprising a pair of spaced plates, a rope seal gripped into by said plates, and anchor pins pinned through the sides of said rope seal and embedded in said slabs to anchor the seal thereto.

9. A road joint mechanism for embedding between concrete road slabs and comprising a pair of spaced connected plates, of a seal means separating said plates, means on said plates for engaging the seal means to hold the same in place, and anchoring members engaged through said seal means and embedded in said slabs.

10. A road joint mechanism for embedding between concrete road slabs and comprising an inner plate, a seal member engaged peripherally around the inner plate, an outer plate engaged around the seal member, and means on said plates to clamp and grip the seal member to hold the same in place to form a seal against leakage into the road joint past said seal member.

11. A road joint mechanism for embedding between concrete road slabs and comprising an inner plate, a continuous seal member peripherally engaged around the inner plate, an outer frame like plate framing the seal member and said inner plate, and anchoring means engaged through the seal member and embedded in the concrete slabs to anchor the seal member thereto.

ROBERT R. ROBERTSON.